3,322,824
COMPOSITIONS CONTAINING A POLYTEREPH-
THALAMIDE AND A HYDROCARBON-SUBSTI-
TUTED SULFONIC ACID, AND PROCESS UTILIZ-
ING THE SAME IN MAKING SHAPED ARTICLES
William J. Roberts, Bernardsville, N.J., assignor to
Celanese Corporation of America, New York, N.Y., a
corporation of Delaware
No Drawing. Filed July 2, 1964, Ser. No. 380,037
15 Claims. (Cl. 260—30.8)

This invention relates broadly to new and useful compositions of matter and to a process wherein these new compositions are utilized in making shaped articles. More particularly the invention is concerned with compositions comprising (1) a high-molecular-weight polyamide, such as the fiber- and film-forming, linear, synthetic polyamides including the polyterephthalamides, and (2) a solvent for the said polyamide comprising a hydrocarbon-substituted sulfonic acid. Still more particularly the invention relates to compositions comprising a polyamide, such as those just mentioned, carried (more particularly dissolved) in a hydrocarbon-substitude sulfonic acid represented by the general formula

I                   $R-SO_3H$ where R represents a radical selected from the group consisting of alkyl (including cycloalkyl), aralkyl, aryl and alkaryl radicals.

The high-molecular-weight polyamides, specifically the polyterephthalamides, possess various characteristics that are considered desirable for the formation of filaments including mono- and multifilaments. Some of these characteristics are, for example, good mechanical properties such as high tenacity and elongation, and a high degree of dye receptivity, water insensitivity and glaze resistance. This particular combination of properties, possessed by for instance, the polyterephthalamides, is not often found in the more widely-used, fiber-forming polymers. However, the polyterephthalamides, especially those melting above about 275° C., cannot be easily melt spun, as can many of the more widely used polyamides, because of their tendency to seriously degrade and/or further polymerize to a useless, infusible mass when they are heated to a degree sufficient to melt them. Hence, any method of forming shaped articles from high-molecular-weight polyterephthalamides that will obviate the melt-spinning difficulties just mentioned is highly desirable.

It is a primary object of the present invention to provide compositions that are useful in forming shaped articles, e.g., filaments, films, threads, rods and the like, from high-molecular-weight polyamides, specifically polyterephthalamides; and, also, a method of forming useful shaped articles, such as those aforementioned, wherein the aforesaid compositions are utilized.

Another object of the invention is to provide a method of forming shaped articles from polyterephthalamides that avoids the difficulties of melt spinning this type of polymer.

Still other objects of the invention will be apparent to those skilled in the art from the following more detailed description and the accompanying claims.

In accordance with one embodiment of the invention, a high-molecular-weight linear polyamide, such as a linear polyterephthalamide or other linear polyamide having substantially the same or equivalent characteristics, is dissolved in a solvent comprising a hydrocarbon-substituted sulfonic acid, more particularly a single or a plurality (two, three, four or any desired number) of hydrocarbon-substituted sulfonic acids of the kind embraced by Formula I, i.e., $R-SO_3H$. Illustrative examples of radicals represented by R in this formula are alkyl radicals, e.g., methyl through dodecyl and higher members of the homologous series, cyclopentyl, cyclohexyl, cycloheptyl, etc.; aralkyl radicals, e.g., benzyl, phenylethyl through phenylhexyl, etc.; aryl radicals, e.g., phenyl, biphenylyl, naphthyl, etc.; and alkaryl radicals, e.g., tolyl, xylyl, ethylphenyl through hexylphenyl, etc. The lower-molecular-weight hydrocarbon-substituted sulfonic acids, such as those wherein the hydrocarbon substituent contains not more than about 12 carbon atoms, are generally more desirable for use because they are either liquids (as in methanesulfonic acid, for example) or, for the most part, have lower melting points than those of higher carbon content. Advantageously R represents an alkyl radical, preferably a lower alkyl radical such as a $C_1$ through $C_6$ alkyl radical.

When a hydrocarbon-substituted sulfonic acid is used alone as a solvent, it is advantageous to employ one having a melting point not substantially higher than that of the polyterephthalamide to be dissolved.

Any suitable temperature may be used in dissolving the polyamide in the hydrocarbon-substituted sulfonic acid. In the case of methanesulfonic acid dissolution may be effected, with agitation, at temperatures ranging from room temperature (20°–30° C.) up to its decomposition point of 167° C. Higher temperatures up to their decomposition points may be employed when effecting dissolution in the normally solid hydrocarbon-substituted sulfonic acids. However, the temperature should not be so high and the time of heating at such temperature so long as to cause excessive degradation and/or polymerization of the polyamide, specifically polyterephthalamide. Dissolution temperatures are usually within the range of from about 20° C. to about 150° C.

If desired, the solvent used in producing the compositions of this invention may contain up to about 30% by weight of a diluent, e.g., acetone, which serves to lower the solidification temperature of the solution. With some of the hydrocarbon-substituted sulfonic acids, e.g., lower-alkanesulfonic acids such as methanesulfonic acid, the presence of a small amount of water (e.g., less than 10% by weight) is not objectionable provided that the temperature and time of heating are controlled so as to avoid excessive degradation of the polymer by hydrolysis or otherwise. With other hydrocarbon-substituted sulfonic acids, e.g., arylsulfonic acids such as benzene sulfonic acid which is normally available in combination with 1.5 moles of $H_2O$, it has been found that this water of crystallization should be removed by suitable vacuum treatment before dissolution is effected.

It is preferred, but not essential, that a hydrocarbon-substituted sulfonic acid be used alone as the solvent for a polyamide such as a polyterephthalamide. In this way there is obtained a composition, more particularly a spinning solution or "dope," wherein the polymer, e.g., a polyterephthalamide, is dissolved with minimum degradation thereof and with maximum stability of the resulting solution. Furthermore, by practicing this invention, lower solution viscosities are obtained at the same polymer concentration as compared with, for example, the use of concentrated sulfuric acid as a solvent for a polyterephthalamide, thereby permitting the preparation of solutions of higher polymer content for the same viscosities. Thus, whereas a polyterephthalamide dissolved at 15 wt. percent solids concentration in methanesulfonic acid (93.0% pure) gives a solution having a viscosity of 1,000 poises at 25° C., the same polyterephthalamide dissolved at the same solids concentration in 98% reagent sulfuric acid gives a solution having a viscosity of 2,500 poises at 25° C. This was entirely unobvious and in no way could have been predicted, and provides economical and other advantages that will be immediately apparent to those working in the field of shaped polyamide articles such as filaments, films and the like.

As indicated in the preceding paragraph, the use of a mixture of solvents is not precluded. Thus, instead of using a hydrocarbon-substituted sulfonic acid alone as a solvent, one may employ a mixture of, for example, concentrated sulfuric acid and the aforementioned sulfonic acid. In any such mixtures the substituted sulfonic acid component preferably constitutes, by weight, a major proportion (more than 50%) and the concentrated sulfuric acid a minor proportion (less than 50%) of the mixture. By using such proportions the disadvantages inherent in the use of concentrated sulfuric acid alone as a solvent are minimized. Such disadvantages include excessive polymer degradation and/or polymerization when concentrated $H_2SO_4$ alone is used as a solvent in making a solution of the polymer unless cooling or other techniques are used to dissipate the heat evolved during dissolution; and the difficulties encountered when a concentrated $H_2SO_4$ solution of the polymer is extruded into a more dilute (e.g., 50%) aqueous $H_2SO_4$ coagulating bath. These latter difficulties include localized heat generation within the fiber that causes non-uniformity in the fiber structure with resultant non-uniformity in the tensile strength and other physical properties of the fiber.

The compositions produced in accordance with this invention may contain, for example, from about 5% to about 30%, preferably from about 10% to about 25%, of polymer based on the weight of the solution. The use of higher or lower amounts, as desired or as conditions may require, is not precluded.

The liquid compositions or solutions of this invention may be extruded through a suitably shaped opening of predetermined cross-section, e.g., the orifices of a spinnerette to form filaments, or a slot-shaped opening to form films. They may be extruded to form shaped articles at a temperature ranging, for example, from about 20° C. to about 150° C.

A wide variety of liquids in which the polymer is insoluble may be used as the coagulating bath in the formation of shaped articles from the solutions of the invention, e.g., tetrahydrofuran, water, acetone, or methyl, ethyl or isopropyl alcohol. The preferred coagulating bath is an aqueous solution of sulfuric acid containing, by weight, from about 43% to about 54% $H_2SO_4$, more particularly from about 45% to about 52% $H_2SO_4$.

As has been indicated hereinbefore, the present invention is particularly applicable in the production of shaped articles from fiber- and film-forming linear polyterephthalamides, and especially to such polyterephthalamides having repeated structural units represented by the general formula II  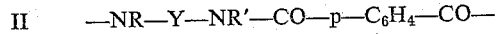 —NR—Y—NR′—CO—p—$C_6H_4$—CO— where R and R′ are each hydrogen or a monovalent hydrocarbon radical, e.g., a lower alkyl radical such as methyl through hexyl, and Y represents a divalent organic radical, e.g., an alkylene radical containing from 1 through 10 carbon atoms including ethylene, tetramethylene, hexamethylene, and cycloalkylene such as 1,4-cyclohexylene, etc.; an arylene radical such as meta- or para-phenylene, para-xylylene, para-diethylenebenzene, etc.; or divalent heterocyclic radicals such as those derived from piperazine or an alkyl-substituted piperazine wherein the open bonds are attached to nitrogen atoms. Such polyterephthalamides are produced by the condensation of terephthalic acid or a derivative thereof, e.g., an ester, acyl halide or a salt of such an acid, with a diamine having substituents such as defined above with respect to R and R′ in Formula II.

Although not limited thereto, the present invention is particularly suitable for use in making compositions from which shaped articles can be made and which comprise poly(polymethylene) terephthalamides wherein the polymethylene groups contain from 1 to 10 carbon atoms, inclusive, e.g., polyhexamethylene terephthalamide, polytetramethylene terephthalamide, polyethylene terephthalamide and polypiperazylene terephthalamide, which latter results from a condensation reaction between piperazine and terephthaloyl chloride.

In order that those skilled in the art may better understand how the present invention may be carried into effect, the following examples are given by way of illustration and not by way of limitation. All percentages are by weight.

EXAMPLE I

The polyamide used in this example is polyhexamethylene terephthalamide having an inherent viscosity of 1.29 measured as a 0.1% solution in 97% sulfuric acid. It is prepared by the interfacial technique from hexamethylene diamine and terephthaloyl chloride using magnesium oxide as an acid binder, as described in Jamison's application Ser. No. 6,885, filed Feb. 5, 1960, and now abandoned, which is assigned to the same assignee as is the invention of this application.

The foregoing polyamide is dissolved, with agitation, in methanesulfonic acid (93% pure) by heating at increasing temperatures ranging from room temperature (20°–30° C.) up to about 100° C. The proportions are such that the solution will contain about 15% of polymer solids. The resulting solution has a viscosity at 25° C. of 1,000 poises. It is extruded through a 0.1 mm. jet at 90° C. into a coagulating bath of aqueous sulfuric acid containing about 47.7% $H_2SO_4$ and which is at a temperature of about 47°–48° C. A useful filament having good physical properties is obtained upon removal from the bath, washing and further processing.

Useful filaments also obtained when the solution of this example is similarly extruded into other coagulating baths in which the polymer is insoluble but the hydrocarbon-substituted sulfonic acid is soluble, e.g., water, isopropyl alcohol and acetone.

The polymer of this example is also dissolved in methanesulfonic acid to yield solutions containing 10% polymer solids in one case and 20% in another. Useful filaments are also produced from these solutions in essentially the same manner described above.

EXAMPLE 2

Same as in Example I with the exception that the polyterephthalamide is dissolved in ethanesulfonic acid (substantially 100% pure) to yield a solution containing about 15% polymer solids. The solution has a viscosity of 2,500 poises at 25° C. Useful filaments can be made from this solution in essentially the same manner described under Example 1.

EXAMPLE 3

In this example benzenesulfonic acid,

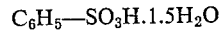 $C_6H_5$—$SO_3H$.$1.5H_2O$ is employed as a solvent for the same polyamide employed in Examples 1 and 2. The proportions are such as will provide a composition containing about 15% of polymer solids. Solution of the polymer is not effected until after the water of crystallization has been removed by means of vacuum treatment of the admixture at 65°–70° C. The solution of the polymer has a viscosity of over 10,000 poises at 25° C.

EXAMPLE 4

Examples 1, 2 and 3 are repeated with the exception that the polymer employed is polypiperazylene terephthalamide prepared by condensing piperazine and terephthaloyl chloride by the interfacial technique, using the procedure indicated in Example 1. These solutions also are formable into useful filaments using the same non-solvent (for the polymer) coagulating liquids used for the polymer of the prior examples. These solutions, as is also true of the solutions of Examples 1 through 3, can also be cast or extruded (through a slot) to form films. The freshly cast or extruded films are then contacted with a coagulating liquid that is a nonsolvent for the polymer but a solvent for the hydrocarbon-substituted sulfonic acid. A solid, uniform film of the polymer is thereby obtained.

Although the invention has been described with particular reference to polyterephthalamides, which are intractable polyamides that are not adaptable for satisfactory melt spinning, the invention is not limited thereto. For instance, the invention may be used in dissolving, and forming shaped articles from, other polymers such as the various polyureas, the various polyurethanes, the various polybenzimidazoles, and the various other polyamides known in the art including those which are normally melt spun. Numerous examples of such polyamides are given in, for example, U.S. Patents 2,130,948, 2,163,584, 2,265,119, 2,276,437, 2,393,972, 2,491,934, and 2,614,999. However, for those polyamides and other polymers that are adaptable for satisfactory melt spinning into filaments or melt forming into other shaped articles, no particular advantages ordinarily accrue when used in practicing the present invention.

It is to be understood that the foregoing detailed description is given merely by way of illustration and that many variations may be made therein without departing from the spirit of my invention.

The embodiments of the invention in which an exclusive property or privilege is claimed are defined as follows:

1. A composition consisting essentially of a high-molecular-weight polyterephthalamide dissolved in a solvent the major weight proportion or substantially all of which consists essentially of (a) a hydrocarbon-substituted sulfonic acid represented by the general formula R—SO$_3$H wherein R represents a radical selected from the group consisting of alkyl, aralkyl, aryl and alkaryl radicals each of which has not more than about 12 carbon atoms, and any remaining weight proportion of said solvent consists essentially of (b) concentrated sulfuric acid.

2. A composition consisting essentially of a high-molecular-weight polyterephthalamide dissolved in a solvent consisting essentially of a hydrocarbon-substituted sulfonic acid having not more than about 12 carbon atoms in the hydrocarbon substituent.

3. A composition as in claim 2 wherein the polyterephthalamide is one that contains repeating structural units represented by the general formula —NR—Y—NR′—CO—p—C$_6$H$_4$—CO— where R and R′ are each selected from the group consisting of hydrogen and monovalent organic radicals, and Y represents a divalent organic radical.

4. A composition as in claim 2 wherein the hydrocarbon-substituted sulfonic acid is an alkanesulfonic acid having not more than 12 carbon atoms in the alkane grouping thereof.

5. A composition consisting essentially of a high-molecular-weight polyterephthalamide dissolved in a solvent consisting essentially of a lower-alkanesulfonic acid having from 1 to 6 carbon atoms, inclusive, in the lower-alkane grouping thereof, said polyterephthalamide containing repeating structural units represented by the general formula —NH—Y—NH—CO—p—C$_6$H$_4$—CO— where Y represents a divalent organic radical.

6. A composition as in claim 5 where Y represents a polymethylene group containing from 1 to 10 carbon atoms, inclusive.

7. A composition consisting essentially of polyhexamethylene terephthalamide dissolved in methanesulfonic acid.

8. A composition consisting essentially of polyhexamethylene terephthalamide dissolved in ethanesulfonic acid.

9. The process which comprises dissolving a high-molecular-weight polyterephthalamide in a solvent the major weight proportion or substantially all of which consists essentially of (a) a hydrocarbon-substituted sulfonic acid having not more than about 12 carbon atoms in the hydrocarbon substituent, and any remaining weight proportion of said solvent consists essentially of (b) concentrated sulfuric acid; and extruding the resulting solution through an opening of predetermined cross-section to form a shaped article.

10. The process as in claim 9 wherein the polyamide is a polyterephthalamide that contains repeating structural units represented by the general formula —NR—Y—NR′CO—p—C$_6$H$_4$—CO— where R and R′ are each selected from the group consisting of hydrogen and monovalent hydrocarbon radicals, and Y represents a divalent organic radical.

11. The process as in claim 10 where the polyterephthalamide has a melting point of at least about 275° C., R and R′ each represent hydrogen and Y represents a polymethylene group containing from 1 to 10 carbon atoms, inclusive; the polyterephthalamide constitutes from about 5% to about 30% by weight of the solution; and the solution is extruded into a liquid nonsolvent for the polyterephthalamide to form a shaped article.

12. The process which comprises dissolving polyhexamethylene terephthalamide in a solvent consisting essentially of a lower-alkanesulfonic acid having from 1 to 6 carbon atoms, inclusive, in the lower-alkalane grouping thereof, and extruding the resulting solution through an opening of predetermined cross-section to form a shaped article.

13. The process as in claim 12 where the shaped article is a filament.

14. The process as in claim 12 wherein the lower-alkanesulfonic acid is methanesulfonic acid.

15. The process as in claim 12 wherein the lower-alkanesulfonic acid is ethanesulfonic acid.

References Cited

UNITED STATES PATENTS

| | | | |
|---|---|---|---|
| 2,359,877 | 10/1944 | Schupp | 260—30.8 |
| 2,404,717 | 7/1946 | Houtz | 260—30.8 |
| 2,503,245 | 4/1950 | Coover et al. | 260—30.8 |
| 2,610,927 | 9/1952 | Foulds | 260—30.8 |
| 2,952,653 | 9/1960 | Heller | 260—30.8 |
| 3,154,609 | 10/1964 | Cipriani | 260—30.8 |

MORRIS LIEBMAN, *Primary Examiner.*

B. A. AMERNICK, *Assistant Examiner.*